United States Patent [19]
Redifer

[11] 3,790,083
[45] Feb. 5, 1974

[54] WINDSHIELD WASHER SYSTEM
[76] Inventor: Robert B. Redifer, 6339 Nicollet Ave., Minneapolis, Minn. 55423
[22] Filed: Nov. 9, 1971
[21] Appl. No.: 197,023

[52] U.S. Cl............................. 239/284, 15/250.04
[51] Int. Cl.............................................. B05b 1/14
[58] Field of Search 15/250.04; 239/284; 248/226 B

[56] References Cited
UNITED STATES PATENTS

| 3,432,876 | 3/1969 | Edwards | 239/284 X |
|---|---|---|---|
| 683,455 | 10/1901 | Fergusson | 248/226 B |
| 3,008,170 | 11/1961 | Marks | 239/284 X |
| 3,428,992 | 2/1969 | Giorgio | 15/250.04 |
| 3,440,679 | 4/1969 | Druseikis | 15/250.04 |
| 2,866,996 | 1/1959 | Krusche | 15/250.04 |

FOREIGN PATENTS OR APPLICATIONS
1,017,027   1/1966   Great Britain...................... 239/284

Primary Examiner—Allen N. Knowles
Assistant Examiner—John J. Love
Attorney, Agent, or Firm—Orrin M. Haugen

[57] ABSTRACT

An improved nozzle means for spraying washer fluid on the surface of an automobile windshield, the nozzle means being arranged for use in combination with an automobile windshield wiper and washer system, the wiper being the standard reciprocating wiper, the washer system including a reservoir to retain a supply of washer fluid, and pressure means to provide a source of such fluid under pressure. Conduit means are arranged to deliver fluid under pressure to said nozzle means. The nozzle means comprises a head having an inlet port and a plurality of outlet ports, with the plurality of outlet ports being generally equally arcuately spaced, one from another, and being disposed so as to impinge upon the surface of said wiper at spaced intervals thereon. Bracket means are provided for mounting the nozzle means on the back of the wiper blade assembly.

3 Claims, 6 Drawing Figures

PATENTED FEB 5 1974

3,790,083

WASHER FLUID FROM SOURCE OF FLUID UNDER PRESSURE

INVENTOR.
ROBERT B. REDIFER

BY

Orrin M. Haugen
ATTORNEY

WINDSHIELD WASHER SYSTEM

BACKGROUND OF THE INVENTION

The present invention relates generally to an improved automobile windshield washer system, and more particularly to such a system wherein the nozzle for dispensing fluid onto the surface of the windshield is mounted directly upon the backing frame for the wiper blade. More specifically, the present invention relates to an improved nozzle means for distributing windshield washer fluid upon the surface of the windshield at controlled spaced intervals therealong.

In the past, various methods have been utilized to distribute washer fluid on the surface of a windshield. In particular these systems may provide for an outlet disposed either at the base of the vehicle hood, or on the mounting head for the reciprocating wiper blade. Such systems normally deliver fluid to the surface of the windshield at various points depending upon the speed of the vehicle, the condition of the pressure system, and the like. As such, such systems have rarely been found useful at highway speeds, and hence, in certain emergency situations, a motorist may be required to significantly reduce his speed or stop in order to remove splashed residual film from the surface of his windshield. The present invention permits such washing to occur at any speed, and means are provided to distribute the washer fluid at spaced intervals along the arc generated by the motion of the reciprocating wiper structure.

In order to accommodate the various styles and varieties of systems presently installed on automotive vehicles, the washer fluid dispensing system of the present invention is arranged to have the nozzle mounted upon the backing frame of the wiper blade, and as such provides closely spaced communication between the outlets of the nozzle means and the surface of the windshield. In the preferred embodiment of the present invention, the nozzle means is provided with three radially spaced outlets, each of which is arranged to deliver fluid to the surface of the windshield at spaced intervals therealong.

In the past, systems have been proposed for washer systems for delivering fluid at spaced intervals along the axial extent of wiper blades. These systems have frequently involved cumbersome mounting techniques, or cumbersome molding requirements for the wiper blade. The present invention overcomes these cumbersome features by providing a mounting bracket which is generally universally adapted for mounting upon the backing frame for the wiper blade, and which may be readily installed by unskilled personnel upon the existing reciprocating windshield wiper of automotive vehicles.

SUMMARY OF THE INVENTION

Therefore, it is a primary object of the present invention to provide an improved windshield washer system for use in combination with existing automobile windshield washer systems, the improved system providing a nozzle means with a plurality of outlet ports, the nozzle means being arranged to be mounted upon the backing frame for the reciprocating windshield wiper.

It is yet a further object of the present invention to provide an improved windshield washer system for automotive vehicles wherein the washer system is provided with a nozzle means including a head having a plurality of arcuately spaced outlet ports, these outlet ports being adapted to provide a plurality of impinging areas on the surface of the windshield.

It is still a further object of the present invention to provide an improved automobile windshield washer system wherein the nozzle means is arranged to be mounted on the windshield wiper frame at a point closely spaced from the surface of the windshield, with bracket means being provided to substantially uniformly accommodate the mounting of the bracket upon the backing frame for reciprocating windshield wipers of motor vehicles.

Other and further objects of the present invention will become apparent to those skilled in the art upon a study of the following specification, appended claims, and accompanying drawing.

DESCRIPTION OF THE PREFERRED EMBODIMENT

Figure 2:
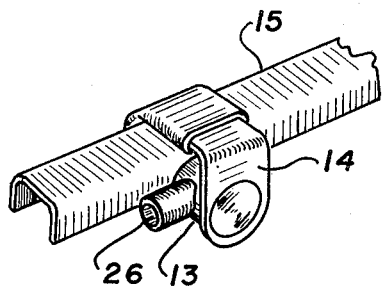
FIG. 2 is a detail perspective view, partially broken away, of the mounting bracket and nozzle portion of the assembly of the present invention, with the mounting bracket and nozzle being shown coupled to a backing frame for a reciprocating windshield wiper.

In accordance with the preferred embodiment of the present invention, and with particular attention being directed to FIGS. 1, 2, 3 and 4, the improved windshield wiper and washer system of the present invention generally designated 10 includes a windshield wiper assembly generally designated 11, conduit means 12, and nozzle means 13 in communication with conduit means 12. Nozzle 13 is secured to bracket 14, with bracket 14 being, in turn, secured to the backing frame member 15 of the wiper 11.

Conduit 12 is arranged to be coupled to the nozzle 17 of wiper head 18, with wiper head 18 being arranged to provide the reciprocatory motion for base arm 19 of wiper assembly 11. As is customary in this type of system, the washer system includes a reservoir to retain a supply of washer fluid, along with pressure means to provide a source of such washer fluid under pressure.

The conventional systems presently in use are arranged to deliver such fluid under pressure to the nozzle means 17, for example. Means are provided to establish communication between the source of pressurized fluid, with such conduit means being shown at 20 in FIG. 6. Also, as is conventional in windshield wiper systems, blade 21 is provided to make contact with the actual surface of the transparent windshield 22 of the vehicle.

Figure 4:
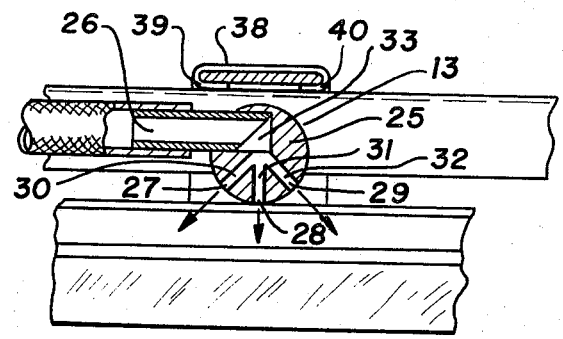
FIG. 4 is a detail sectional view taken along the line and in the direction of the arrows 4—4 of FIG. 3.
Figure 3:
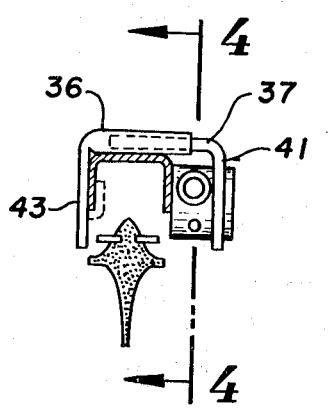
FIG. 3 is a vertical sectional view taken through the windshield wiper and washer system shown in FIG. 1, with the fluid conduit means having been removed.

With continued attention being directed to FIGS. 2, 3 and 4 of the drawings, it will be appreciated that the nozzle 13 includes a head member such as is shown at 25, along with an inlet port 26 and a plurality of outlet ports 27, 28, and 29. As is indicated in FIG. 4, the outlet ports are arranged at radially spaced dispositions, one from another, with each port lying at the end of a bore, such as the bores 30, 31, and 32. Also, as is apparent in FIG. 4, a chamber area is shown at 33, the chamber lying at the inner end of each of the respective bores 30, 31 and 32. As is apparent from FIG. 4, each of the bores 30, 31 and 32 is substantially equal in length, one to another.

With continued attention being directed to FIGS. 2, 3 and 4, it will be apparent that the bracket means for mounting the nozzle means onto the backing frame for the wiper includes a first and a second generally L-shaped telescoping member, such as the members 36 and 37, with member 37 having a leg portion 38 with inwardly turned flange ears 39 and 40 to arrange for telescoping engagement with the corresponding leg of member 37. The telescoping engagement is shown in detail in FIG. 4. The nozzle means 13 is secured to the base leg of one of the telescoping members, such as to the base leg 41 of member 37.

As is apparent from the drawing, the flanged leg portions 39 and 40 are arranged to be compressed so as to provide press-fit engagement with the corresponding leg portion of member 37. Thus, substantially universal mounting is available for the various backing frame members in use on windshield wiper structures presently.

In order to mount the member onto the backing frame of the windshield wiper, the telescoping legs are placed in appropriate engagement, and the individual flanges legs 39 and 40 are compressed so as to provide firm engagement. Thereafter, leg 43 of member 36 is turned inwardly as shown in phantom in FIG. 3 so as to engage the inner and underside of the backing member 15 of wiper 11.

The arcuately spaced arrows in FIG. 4 indicate the diverse angle which provides impingement of the fluid upon the surface of the vehicle windshield. Thus, even under conditions of highway speed, fluid may be discharged from the pressure washer system directly onto the windshield, thus providing for washing of the windshield under a variety of operating conditions. This arrangement finds itself to be insensitive to variations in speed, pressures, and the like.

It will be appreciated, of course, that the structure of the present invention may be fabricated from readily available materials, with anodized aluminum along with either machined or die cast stainless steel being desired for the bracket and with any suitable material being acceptable for fabrication of the nozzle means. It is preferred that the materials of construction for conduit 12 be capable of operation at low temperatures, with certain vinyls being commercially available having low temperature capabilities in the area of −65° F. It will accordingly be appreciated that no unusual requirements exist for the materials of construction.

Figure 1:
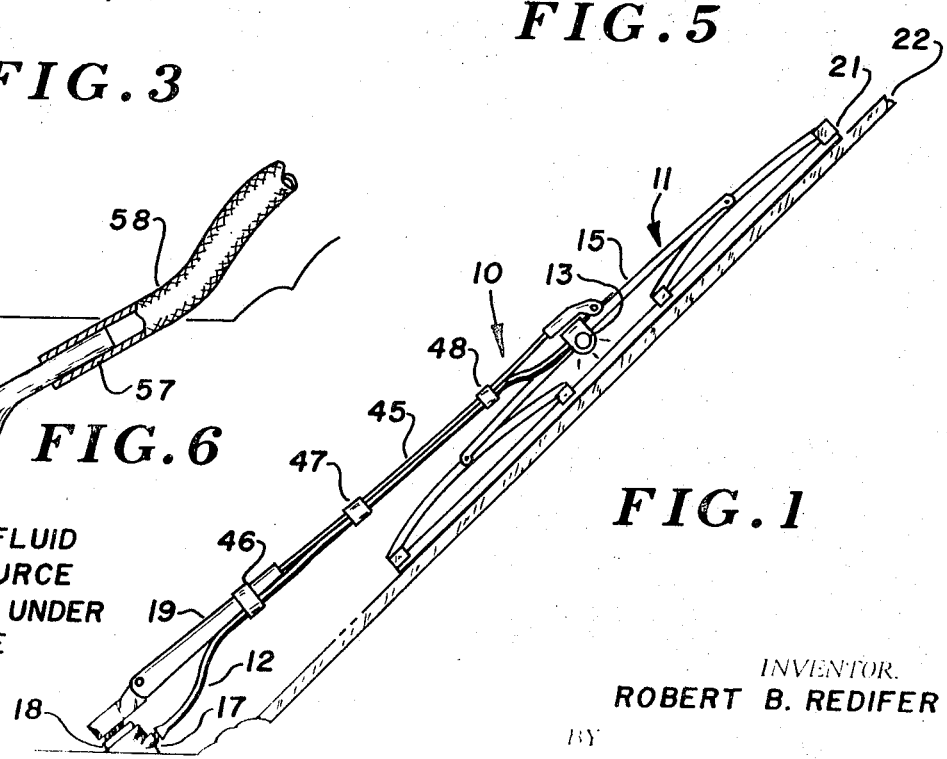
FIG. 1 is a side elevational view of the improved windshield washer system of the present invention shown mounted on a typical reciprocating windshield wiper for an automotive vehicle, the improved washer system being coupled to the existing washer system of the vehicle.

In the embodiment illustrated in FIG. 1, it will be seen that conduit 12 is arranged along the surface of wiper bracket 45 by virtue of a plurality of spaced clip or tape members 46, 47, and 48. These clip or tape members are preferably fabricated from metal, plastic or pressure sensitive tape, and may be secured to the wiper frame in order to hold the conduit 12 in proper disposition along the wiper frame.

Figure 5:
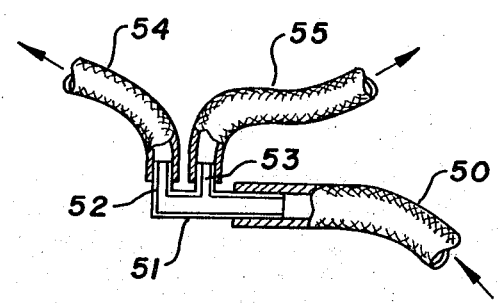
FIG. 5 is a detail view, partially in section, and showing a typical conduit coupling arrangement for delivering washer fluid under pressure from a pressure source, not shown, to each of a pair of reciprocating windshield wipers equipped with the washer system of the present invention.
Figure 6:
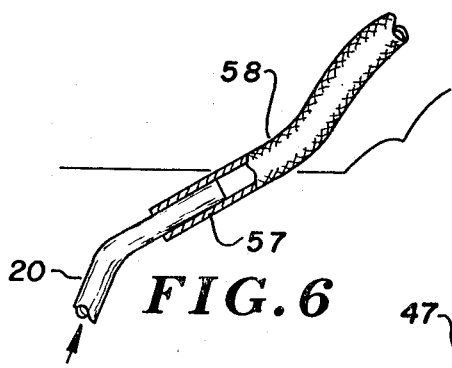
FIG. 6 is a detail elevational view, partially broken away, and illustrating a manner in which a conduit for transmission of fluid under pressure may be coupled to the existing washer system of a vehicle, and arranged to deliver washer fluid under pressure to a nozzle secured to the backing frame of a reciprocating windshield wiper.

Attention is now directed to FIGS. 5 and 6 of the drawing wherein various conduit systems are illustrated. In FIG. 5, for example, a single conduit source 50 is shown which extends from a washer fluid source delivering fluid under pressure, conduit 50 terminating in the F-shaped ell 51, ell 51 having a pair of discharge legs 52 and 53 establishing communication with secondary conduits 54 and 55. These secondary conduits 54 and 55 extend onto the wiper frame 11 in the same fashion as is illustrated in FIG. 1, with the exception being that they are arranged to converge centrally of the automobile cowl, as is apparent from the drawing. Such an arrangement will be utilized for those systems wherein a single discharge head is provided in the automotive vehicle.

Attention is now directed to FIG. 6 wherein a modified form of discharge system is illustrated, and adapted to be coupled to the wiper system of the structure. In this arrangement, a discharge head is provided as at 57 in conduit 20, with this discharge head being enclosed within the confines of flexible conduit 58 which extends onto the wiper arrangement as illustrated in FIG. 1. As apparent from the drawing, conduits 12, 50, 54, 55 and 58 are all flexible in nature, so as to accommodate the reciprocating motion of the wiper member 11.

While specific structures for the nozzle means has been illustrated, it will be appreciated that other systems may be illustrated with variations in the nozzle structure, it being appreciated, of course, that the length of the plural passageways should be generally equal, one to another, inasmuch as they are normally rather small diameter, and thus could provide for resistance to fluid flow. Also, while substantially 45° radial spread is indicated for the individual bores 30, 31 and 32, this spread could be suitable for 30°, or as large as 55°. If the angular spread is less than 30°, the spread of area coverage is rendered undesirably low, while if greater than 55°, the spread is unreasonably high and the pressurized fluid being sprayed may be subjected to external forces.

Generally speaking, the bore available in the structure for the bores 30, 31 and 32 is of the order of 0.031 inch, and as such, bores of substantially 7/64th inch in length accommodate conventional washer fluids quite well.

I claim:

1. In combination with an automobile windshield wiper washer system having a reciprocating windshield wiper, a reservoir to retain a supply of washer fluid, pressure means to provide a source of such fluid under pressure, and port means establishing communication with said source of pressurized fluid, said windshield wiper consisting of a wiper blade and a generally rigid backing frame therefor extending substantially coextensive with the wiper blade, the improvement comprising:

a. nozzle means, bracket means attaching said nozzle to said backing frame and conduit means coupling said port means to said nozzle means;
b. said nozzle means comprising a head, an inlet port to said nozzle means, a plurality of outlet ports, and bore means in said head extending between said inlet port and a chamber area, with said chamber area being in communication with a plurality of outlet passageways, each passageway terminating in one of said plurality of outlet ports, said plurality of outlet ports being generally equally arcuately spaced, one from another, and being disposed so as to impinge fluid directly onto the surface of said windshield along a plane transverse to the windshield surface and at spaced intervals thereon;
c. said conduit means being in communication with the inlet port of said nozzle means; and
d. said bracket means comprising first and second generally L-shaped telescoping members, one of said telescoping members having a flanged upright leg for receiving and confining the corresponding and generally planar leg of the other, and with said nozzle means being secured to the base leg of one of said telescoping members.

2. The combination as defined in claim 1 being particularly characterized in that said flanged leg is adapted for press-fit engagement with said generally planar leg.

3. The combination as defined in claim 2 being particularly characterized in that said bracket means is adapted for mounting generally adjacent the center of said backing frame.

* * * * *